United States Patent [19]

Theodore et al.

[11] Patent Number: 4,530,957

[45] Date of Patent: * Jul. 23, 1985

[54] NON-AQUEOUS DISPERSIONS BASED ON CAPPED STABILIZERS AND REACTANTS COMPRISING POLYFUNCTIONAL MONOMERS I

[75] Inventors: Ares N. Theodore, Farmington Hills; Mohinder S. Chattha, Livonia, both of Mich.

[73] Assignee: Ford Motor Company, Dearborn, Mich.

[ * ] Notice: The portion of the term of this patent subsequent to Oct. 30, 2001 has been disclaimed.

[21] Appl. No.: 455,701

[22] Filed: Jan. 5, 1983

[51] Int. Cl.³ .......................... C08J 3/08; C08L 51/00; C08L 51/06; C08L 51/08

[52] U.S. Cl. .................................. 524/504; 524/853; 524/854; 524/923; 525/70; 525/73; 525/74; 525/77; 525/78; 525/79; 525/80; 525/278

[58] Field of Search ............ 525/278, 70, 73, 74, 525/77, 78, 79, 80; 524/504, 852, 853, 854, 923

[56] References Cited

U.S. PATENT DOCUMENTS

| | | | |
|---|---|---|---|
| 3,317,635 | 5/1967 | Osmond et al. | 525/296 |
| 3,514,500 | 5/1970 | Osmond et al. | 526/202 |
| 3,607,821 | 9/1971 | Franks et al. | 562/202 |
| 3,666,710 | 5/1972 | Makhlouf et al. | 524/461 |
| 3,686,111 | 8/1972 | Makhlouf et al. | 524/530 |
| 3,876,603 | 4/1975 | Makhlouf | 523/210 |
| 3,880,796 | 4/1975 | Christenson et al. | 524/461 |
| 3,966,667 | 6/1976 | Sullivan et al. | 524/474 |
| 4,025,474 | 5/1977 | Porter, Jr. et al. | 528/245.5 |
| 4,055,607 | 10/1977 | Sullivan et al. | 525/155 |
| 4,075,141 | 2/1978 | Porter, Jr. et al. | 524/56 |
| 4,115,472 | 9/1978 | Porter, Jr. et al. | 525/66 |
| 4,147,688 | 4/1979 | Makhlouf et al. | 526/273 |
| 4,180,619 | 12/1979 | Makhlouf et al. | 526/202 |
| 4,242,384 | 12/1980 | Andrew et al. | 427/421 |

FOREIGN PATENT DOCUMENTS

1156235 6/1969 United Kingdom .

OTHER PUBLICATIONS

Waite, *J. Oil Chem. Assoc.*, 1971, S4, 342–350, pp. 342–350 (particularly p. 348).
Barrett, "Dispersion Polymerization in Organic Media", John Wiley & Sons, 1975, pp. 230–232.

*Primary Examiner*—Allan M. Lieberman
*Attorney, Agent, or Firm*—Lorraine S. Melotik; Roger L. May

[57] ABSTRACT

Crosslinked, preferably acrylic, preferably melamine crosslinked, polymer particles formed by reactions comprising free radical addition polymerization of:

(a) between about 0.5 and about 20 weight percent each of first and second monomers, each bearing functionally capable of crosslinking reaction with the other and additionally wherein the first monomer is ethylenically unsaturated and the second monomer bears multiple crosslinking functionality and no ethylenic unsaturation, (b) between about 60 and about 99 weight percent of at least one other monoethylenically unsaturated monomer;

in the presence of (I) an organic liquid which is a solvent for the polymerizable monomers, but a non-solvent for the resultant polymer, and (II) polymeric dispersion stabilizer wherein the precursor of the first segment of the stabilizer comprises a long chain hydrocarbon molecule having only one reactive group per molecule, preferably being a carboxyl group.

14 Claims, No Drawings

NON-AQUEOUS DISPERSIONS BASED ON CAPPED STABILIZERS AND REACTANTS COMPRISING POLYFUNCTIONAL MONOMERS I

Reference is made to commonly assigned related U.S. applications Ser. No. 455,696 entitled "Non-aqueous Dispersions Based on Capped Stabilizers and Reactants Comprising Polyfunctional Monomers II", Ser. No. 455,687, entitled "Non-aqueous Dispersions Based on Capped Stabilizers and Vinyl Monomers II", and Ser. No. 465,856, now U.S. Pat. No. 4,480,069, entitled "Non-aqueous Dispersions Based on Capped Stabilizers and Vinyl Monomers I", all to Theodore et al., and filed on Jan. 5, 1983. Further reference is made to commonly assigned related U.S. applications, Ser. No. 468,901, now abandoned, entitled "Preparation of Non-aqueous Dispersions with Use Of Monofunctional Stabilizer" to Chattha et al, Ser. No. 468,902, now U.S. Pat. No. 4,493,914, entitled "Crosslinked Flow Control Additives for High Solids Paints II" to Chattha, and Ser. No. 468,912, entitled "Crosslinked Flow Control Additives for High Solids Paints I" to Cassatta et al. all filed Feb. 23, 1983.

TECHNICAL FIELD

This invention relates to stable, crosslinked polymer particles and non-aqueous dispersions containing such particles. More particularly, the invention relates to such stable crosslinked, preferably acrylic, preferably melamine crosslinked, polymer particles prepared in the presence of a polymeric dispersion stabilizer wherein the precursor of the first segment of the stabilizer comprises a long chain hydrocarbon molecule having only one reactive group per molecule, preferably being a carboxyl group and additionally preferably being present as a terminal reactive group on the molecule.

BACKGROUND ART

Suitable crosslinked acrylic polymer particles of the type which may employ the stabilizer of this invention are well known. U.S. Pat. No. 4,147,688 to Makhlouf et al teaches crosslinked dispersions wherein crosslinked acrylic polymer microgel particles are formed by free radical addition polymerization of alpha, beta ethylenically unsaturated monocarboxylic acids, at least one other copolymerizable monoethylenically unsaturated monomer and a certain percentage of crosslinking monomer, in the presence of a hydrocarbon dispersing liquid (See abstract, examples and claims). Other crosslinked dispersions containing microgel particles are disclosed in the patent application and patents referred to in the Makhlouf et al disclosure.

U.S. Pat. No. 4,025,474 to Porter et al discloses a polyester based coating composition which includes the crosslinked dispersions disclosed by Makhlouf et al. U.S. Pat. No. 4,075,141 to Porter et al discloses carboxylic acid amide interpolymer-based coating compositions including the same crosslinked dispersions. U.S. Pat. No. 4,115,472 also to Porter et al, discloses urethane coating compositions also including the crosslinked dispersions of Makhlouf et al. U.S. Pat. No. 4,055,607 to Sullivan et al discloses thermosetting compositions of (a) solution acrylic polymer, (b) at least 0.5% of microgel particles formed by polymerizing hydroxyl bearing monomers with nonhydroxyl bearing monomers in the presence of the stabilizer disclosed by Makhlouf et al, and (c) melamine resin. The microgel dispersion of Sullivan et al thus contains functionality capable of reacting with the melamine crosslinking agent.

The dispersion stabilizer employed in producing the microgel particles of the Makhlouf et al compositions are generally polymeric and contain at least two segments, with one segment being solvated by the dispersion liquid and the second segment being of different polarity than the first segment, and relatively insoluble, compared to the first segment, in the dispersing medium. Included among the dispersion stabilizers referred to in the Makhlouf et al patent are polyacrylates and methacrylates, such as poly(lauryl)methacrylate and poly(2-ethylhexylacrylate); diene polymers and copolymers such as polybutadiene and degraded rubbers; aminoplast resins, particularly high naphtha-tolerant compounds such as melamine formaldehyde resins etherified with higher alcohols (e.g., alcohols having 4 to 12 carbon atoms); and various copolymers designed to have desired characteristics (see Col. 5, lines 1–27).

Among the numerous dispersion stabilizers, which could be employed in compositions of Makhlouf et al and to which the particular stabilizer precursor of this invention may be applied, are those taught by U.S. Pat. No. 3,607,821 to Clarke. Clarke teaches a stabilizer for non-aqueous dispersions wherein the stabilizer is chemically reacted with dispersed particles of the dispersion (Col. 1, lines 36–42). Each co-reactant stabilizer molecule forms from 1 to 10 (preferably 1 to 4) covalent links with the dispersed polymer (Col. 1, lines 50–52). The covalent links between the stabilizer and the dispersed polymer are formed by reaction between chemical groups provided by the stabilizer and complementary chemical groups provided by the dispersed polymer or by copolymerization reaction (Col. 1, lines 63–67).

Particularly preferred dispersion stabilizers of Makhlouf et al and the general type of stabilizer employed in the preparation of particles of this invention are those which are graft copolymers comprising two polymeric segments with one segment being solvated by the dispersion liquid and not associated with polymerized particles of the polymerizable ethylenically unsaturated monomers and the second segment being an anchor polymer of different polarity from the first type and relatively non-solvatable by the hydrocarbon solvent and capable of anchoring with the polymerized particles of the ethylenically unsaturated monomer. This anchor polymer segment contains pendant groups capable of copolymerizing with the ethylenically unsaturated monomer used in form the particles of the dispersion (See Col. 5, lines 28–40 of Makhlouf et al).

DISCLOSURE OF THE INVENTION

The crosslinked stable polymer particles of this invention are those which are formed by reactions comprising addition polymerization of (a) between about 0.5 and about 20 weight percent each of first and second monomers, wherein the first monomer bears ethylenic unsaturation and functionality capable of crosslinking reaction with other functionality present on the second monomer bearing multiple other functionality and bearing no ethylenic unsaturation and (b) between about 99 and about 60 weight percent of at least one other monoethylenically unsaturated monomer, in the presence of (I) organic liquid which is a solvent for the polymerizable monomers, but a non-solvent for the resultant polymer, and (II) a polymeric dispersion stabililzer. The polymeric dispersion stabililzer as described above in the discussion of the prior art, in its broadest sense contains at least two segments, with one segment being solvated by the organic liquid and the second segment being of different polarity than the first segment and relatively insoluble in the organic liquid. The crosslinked dispersion is prepared by carrying out the addition polymerization at an elevated temperature such that the dispersion polymer is first formed and then crosslinked.

In this invention the precursor of the first segment of the stabilizer comprises a long chain hydrocarbon molecule having only one reactive group per molecule, preferably, additionally being present as a terminal reactive group on the molecule.

This invention is also directed to non-aqueous dispersions containing such particles and paint compositions employing such particles, e.g., as flow control agents.

One of the serious disadvantages of the aforementioned prior art systems of particle formation is the inherent restriction placed on the selection of suitable monomers which can be employed therein. This restriction results from the use of a first segment precursor which generally contains two different terminal functional groups, each of which is capable of reaction. Since it is desired therein to react only one of these groups, the selection of monomers meeting this condition is limited. Additionally, the presence of the unreacted terminal polar functional group on the first segment diminishes the desired non-polarity of this segment.

We have now found that by employing a first segment precursor having only one reactive functional group per molecule in accordance with the teachings of this invention, the aforementioned disadvantages can be effectively eliminated, thereby allowing the formation of a more distinctly non-polar first segment and the use of other preferred monomers such as isocyanates (both in stabilizer and particle formation) which advantageously offer more rapid, complete reactions and simpler process conditions.

BEST MODE OF THE INVENTION

The polymeric dispersion stabilizer of the invention, as described above, comprises a first segment being formed from a long chain hydrocarbon molecule having only one reactive group present on the molecule. This hydrocarbon molecule generally has a number average molecular weight ($\overline{M}_n$) in the range of between about 350 and about 3300, preferably between about 1500 and about 2500. Included among such molecules, i.e., first segment precursors, are capped condensation polymers. The capped condensation polymers are obtained from uncapped polymers. Such uncapped polymers may be made, for example, by condensation reactions producing a polyester or polyether. The most convenient monomers to use are hydroxy acids or lactones. The hydroxy acids self-condense to form hydroxy acid polymers. In such cases, wherein the resultant polymer contains e.g., two different reactive groups per molecule, the polymers are subsequently capped, i.e., one of the two functional groups is reacted (blocked) so as to leave only one reactive group on the polymer. For example, a hydroxy fatty acid such as 12-hydroxystearic acid may be self-condensed to form poly(12-hydroxystearic acid), which is then capped by reaction with e.g., an alkyl monocarboxylic acid. In this embodiment, the carboxyl group of the monocarboxylic acid reacts with the hydroxyl group of the poly(acid) leaving only one reactive group, the carboxyl group, on the polymer. These reactions, the self-condensation and capping, may be carried out in situ with singularly combined materials or in two steps as would be apparent to one skilled in the art.

Somewhat more complex, but still useful polyesters may be made by reacting diacids with diols. For example, 1,12-dodecanediol may be reacted with sebacic acid or its diacid chloride to form a component which could then be capped and employed as described above as the first segment precursor.

As would be apparent to one skilled in the art, a variety of capping materials may be employed in the subject invention, whose selection would be dependent on the particular functional group to be capped. In the embodiment wherein poly(12-hydroxystearic acid) is employed and it is desired to react (cap) the terminal hydroxyl group, suitable capping material would include alkyl monocarboxylic acids and alkyl isocyanates, with aliphatic monocarboxylic acids being preferred. In these capping materials, the alkyl group preferably comprises $C_3$–$C_{17}$ carbon atoms.

In order to form the first segment of the stabilizer (alternatively called the "macromonomer"), the described first segment precursor (i.e., having only one reactive group) is reacted with a monomer containing an ethylenic unsaturation, preferably an alpha-beta unsaturation, and having a functionality capable of reacting with the reactive group of the first segment precursor molecule. Suitable monomers for use with hydroxy or carboxyl functional first segment precursors include, for example, those having functionality such as isocyanate, glycidyl, hydroxyl or halide (in addition to the ethylenic unsaturation). Exemplary and preferred of such monomers are acrylic monomers such as isocyanatoethyl methacrylate, glycidyl methacrylates and hydroxy acrylates and methacrylates. In a preferred embodiment wherein the first segment precursor comprises blocked poly(12-hydroxystearic acid) having only a carboxyl group, the monomer preferably contains an isocyanate or glycidyl functionality which reacts with the carboxyl group of the capped acid to form the desirably non-polar first segment of the stabilizer. However, while acrylic monomers, and particularly those described above are preferred, any monomer capable of reacting with the monofunctional first segment precursor to add an ethylenic unsaturation thereto would be useful in this invention as would be apparent to one skilled in the art.

As discussed above, the polymeric dispersion stabilizer of the crosslinked dispersions to which the characterization of the first segment precursor of this invention applies are generally those containing at least two segments, with one segment being solvated by the dispersing liquid and the other being of different polarity than the first segment and relatively insoluble in the dispersing liquid. Various types of such polymeric dispersion stabilizers are discussed in the aforementioned Makhlouf et al patent, the disclosure of which is hereby incorporated by reference. Preferred types of stable crosslinked dispersions to which the particular first segment precursor of the stabilizer of this invention applies are those in which the dispersion stabilizer is a graft copolymer containing two polymeric segments with one segment being solvated by the dispersing liquid and the second segment being an anchor polymer of different polarity than the first segment and being relatively non-solvatable by the dispersing liquid. Such preferred polymeric dispersion stabilizers contain pendant groups (e.g., ethylenic unsaturation, hydroxyl, etc.) on the anchor polymer which may react with the ethylenically unsaturated monomers in the copolymerization process used to make the crosslinked dispersed particles. Preferably such chemical reaction is by way of addition copolymerization with the ethylenically unsaturated monomers used in the preparation of the crosslinked particles through ethylenic unsaturation on the anchor segment of the polymeric dispersion stabilizer, however such reaction may include that between other reactive groups respectively present on the particle monomers and anchor polymer.

The pairs of reactive functionalities present on the ethylenically unsaturated monomers reacted to add the ethylenic unsaturation on the anchor portion of the dispersion stabilizer graft copolymer can be selected from a wide variety of functionalities which will be apparent to one skilled in the art. Among the preferred pairs of reactive functionalities which may react so as to add ethylenic unsaturation to the stabilizer are isocyanate and hydroxyl; acid and epoxide; epoxide and amine; acid anhydride and hydroxyl; acid anhydride and amine; acid anhydride and mercaptan; hemiformal and amide; carbonate and amine; cycloimide and amine; cycloimide and hydroxyl; imine and alkoxysilane, etc.

In addition to such monomers, other monoethylenically unsaturated monomers are coreacted therewith to form the anchor polymer of the dispersion stabilizer. While it is preferred that these monomers be methacrylic monomers, any such monomer containing ethylenic unsaturation could be so employed in this invention. Particularly preferred are alkyl esters of acrylic or methacrylic acid having about 1 to about 4 carbons in the alkyl group. Suitable examples include propyl acrylate, butyl acrylate, methyl methacrylate and ethyl acrylate. Other ethylenically unsaturated monomers which may be advantageously employed include, for example, the vinyl aromatic hydrocarbons, such as styrene alpha-methyl styrene, vinyl toluene, unsaturated esters of organic and inorganic acids, such as vinyl acetate, vinyl chloride and the like, and the unsaturated nitriles, such as acrylonitrile, methacrylontrile, enthacrylonitrile and the like.

Generally, the monomers reacted to form the anchor portion of the stabilizer include between about 0.5 and about 10.0 weight percent each of the monomers employed to add the ethylenic functionality on the anchor portion of the stabilizer and between about 99 and about 80.0 weight percent of the other monoethylenically unsaturated monomers.

There are two particularly preferred anchor portions of the dispersion stabilizer employed in forming the crosslinked particles to which this invention applies (in which the polymeric dispersion stabilizer is of the aforementioned, preferred graft copolymerized type). In one, the first segment of the stabilizer as taught above is graft copolymerized with methyl methacrylate and hydroxyethyl methacrylate, whereafter the resulting product containing pendant hydroxyl groups, is reacted with isocyanatoethyl methacrylate, thus adding ethylenic unsaturation to the stabilizer (by means of the isocyanate-hydroxyl reaction). In another embodiment, the first segment of the stabilizer is graft copolymerized with methyl methacrylate and glycidyl methacrylate, and thereafter this copolymer product, containing pendant epoxy groups, is reacted with methacrylic acid to add the ethylenic unsaturation to the stabilizer (by means of the acid-epoxide reactions).

Exemplary of one embodiment of the dispersion stabilizer taught herein is that made by a multiple-step process which is accomplished in two sequential batches. The particles are prepared using the stabilizer in a manner which is similar to well known nonaqueous dispersion processing. First, 12-hydroxystearic acid is self-condensed to form poly(12-hydroxystearic acid), a linear polyester having a terminal carboxyl group on one end and a terminal hydroxy group on the other, which is subsequently capped by reaction with an alkyl monocarboxylic acid, e.g., stearic acid. (Alternatively, the capped poly(12-hydroxystearic acid) can be prepared in one step by combining all ingredients and allowing them to react.) The capped polyacid is then reacted with (1:1 mole ratio) of glycidyl methacrylate. The glycidyl functionality reacts with the terminal carboxyl functionality to form an ester linkage, a hydroxy group and terminal ethylenic unsaturation. This "macromonomer" (0.10 mole) is then reacted by free radical polymerization with, for example, methyl methacrylate (1.86 moles) and a small amount of hydroxyethyl methacrylate (0.169 moles) to form the graft copolymer (stabilizer precursor). This graft copolymer is then modified by reacting the hydroxyl group present from the polymerized hydroxyethyl methacrylate with isocyanatoethyl methacrylate (0.043 moles), thus providing a graft copolymer (stabilizer) with vinyl groups or "hooks" extending from the methyl methacrylate backbone.

The monomer solution employed in making the dispersion generally contains between about 1 and about 30 weight percent of the stabilizer based on the weight of the monomers used to form the particles.

The crosslinked particles to which the particular stabilizer of this invention applies are prepared by addition polymerization of (a) between about 0.5 and about 20 weight percent each of first and second monomers, wherein the first monomer bears ethylenic unsaturation and functionality capable of crosslinking reaction with other functionality present on the second monomer bearing multiple such other functionality and bearing no ethylenic unsaturation, and (b) between about 99 and about 60 weight percent of at least one other monoethylenically unsaturated monomer. The second monomer bears multiple other functionality, i.e., having two or more, preferably three of such other functionalities capable of crosslinking reaction with reactive functionality on the first monomer. The addition polymerization is carried out in the presence of an organic liquild which is a solvent for the polymerizable monomers, but a nonsolvent for the resultant polymer and in the presence of the aforementioned polymeric dispersion stabilizer.

The crosslinking functionalities on the first and second monomers (a) in this type of particle formation can be selected from a wide variety of functionalities which will be apparent to those skilled in the art. Among the preferred pairs of crosslinking functionalities which may be present on the first and second monomers are: hydroxyl and isocyanate; acid and epoxide; epoxide and amine; hydroxyl and amine; acid anhydride and mercaptan; hemiformal and amide; carbonate and amine; cycloimide and amine; cycloimide and hydroxyl; imine and alkoxysilane; etc.

While the first ethylenically unsaturated monomer of the first and second monomers (a) may be any ethylenically unsaturated monomers within the scope of such term (i.e., any monomer which bears ethylenic unsaturation), it is preferred that the monomers be acrylic monomers (i.e., monomers based on acrylic, methacrylic or ethacrylic acids).

Exemplary of such first and second monomers which may be employed in particle formation include, but are not limited to, hydroxy unsaturated monomers and multifunctional amines, e.g., hydroxyethyl methacrylate and melamine resins; hydroxy unsaturated monomers and multifunctional isocyanates, e.g., hydroxyethyl methacrylate and tri-isocyanates; unsaturated acid monomer and polyfunctional epoxides, e.g., methacrylic acid and diepoxides; unsaturated epoxy monomers and polyacids, e.g., glycidyl methacrylate and azelaic acid; etc. One particular preferred embodiment of the first and second monomers employed to form the particle are hydroxyethyl methacrylate and melamine resins.

Optionally, a minor amount of a first or second monomer, as described above, may be replaced by another of the first or second monomers, e.g., in place of some hydroxyethyl methacrylate in reaction with melamine, a minor amount of glycidyl methacrylate and acrylic acid may be employed. Also, other of these first and second monomers may be employed in addition to the first and second monomer, e.g., melamine may be employed in addition to glycidyl methacrylate and diacid.

Various other monoethylenically unsaturated monomers may be copolymerized with the monomers in the preparation of the crosslinked dispersed particles. Although essentially any copolymerizable monoethylenically unsaturated monomer may be utilized, depending upon the properties desired, the preferred monoethylenically unsaturated monomers are the alkyl esters of acrylic or methacrylic acid, particularly those having about 1 to about 4 carbons in the alkyl group. Representative of such compounds are alkyl acrylates, such as methylacrylate, ethyl acrylate, propyl acrylate and butyl acrylate and the alkyl methacrylates, such as methyl methacrylate, ethyl methacrylate, propyl methacrylate and butyl methacrylate. Other ethylenically unsaturated monomers which may be advantageously employed include, for example, the vinyl aromatic hydrocarbons, such as styrene alpha-methyl styrene, vinyl toluene, unsaturated esters of organic and inorganic acids, such as vinyl acetate, vinyl chloride and the like, and the unsaturated nitriles, such as acrylonitrile, methacrylonitrile, ethacrylonitrile and the like.

A preferred embodiment of crosslinked polymer particles within the scope of the invention is formed by reactions comprising free radical addition copolymerization, in the presence of the dispersion stabilizer and in the presence of a hydrocarbon dispersing liquid, of from about 0.5 to about 20, preferably from about 2 to about 10 weight percent, of ethylenically unsaturated hydroxy monomers, from about 0.5 to about 20 weight percent, preferably from about 2 to about 10 weight percent of a crosslinking monomer selected from the group consisting of amine-aldehyde resins, and from about 99 to about 60, preferably from about 96 to about 90 weight percent of at least one other copolymerizable monoethylenically unsaturated monomer.

Exemplary of particularly preferred ethylenically unsaturated hydroxy monomers for use in this preferred embodiment are hydroxy-acrylic monomers such as 2-hydroxyethyl acrylate; 3-chloro-2-hydroxypropyl acrylate; 2-hydroxy-1-methylethyl acrylate; 2-hydroxypropyl acrylate; 3-hydroxy-propyl acrylate; 2-hydroxybutyl acrylate; 4-hydroxybutyl acrylate; diethyleneglycol acrylate; 5-hydroxypentyl acrylate; 6-hydroxyhexyl acrylate; triethyleneglycol acrylate; 7-hydroxyheptyl acrylate; 2-hydroxymethyl methacrylate; 3-chloro-2-hydroxypropyl methacrylate; 2-hydroxy-1-methylethyl methacrylate; 2-hydroxypropyl methacrylate; 3-hydroxypropyl methacrylate; 2-hydroxybutyl methacrylate; 4-hydroxybutyl methacrylate 5-hydroxypentyl methacrylate; 6-hydroxyhexyl methacrylate; 1,3-dimethyl-3-hydroxybutyl methacrylate; 7-hydroxyheptyl methacrylate, with hydroxyethyl methacrylate being most preferred.

Amine-aldehyde crosslinking resins suitable for crosslinking hydroxy functional bearing materials are well known in the art. Typically, these crosslinking materials are products of reactions of melamine, or urea with formaldehyde and various alcohols containing up to and including 4 carbon atoms. Preferably, the amine-aldehyde crosslinking agents useful in this invention in particle formation are condensation products of formaldehyde with melamine, substituted melamine, urea, benzoguanamine or substituted benzoguanamine. Preferred members of this class are methylated malamine-formaldehyde resins such as hexamethoxymelamine.

Particularly preferred of such crosslinking agents useful in the particle formation of this invention with hydroxy functional materials are the amino crosslinking agents sold by American Cyanamid under the trademark "Cymel". In particular, Cymel 301, Cymel 303 and Cymel 325 which are alkylated melamine-formaldehyde resins, are useful in the compositions of this invention.

The particles of this invention can be left as dispersions in the solvent employed in particle formation or the solvent employed in particle formation can be removed, leaving the particles in a powder form. These particles, when present as a dispersion in the solvent or as a dry powder, can be employed as flow control agents in liquid system coatings, for example, in such as those taught in U.S. application Ser. No. 334,683 to Chattha and Theodore, now U.S. Pat. No. 4,376,187, and Ser. Nos. 334,685, now abandoned, and 334,799, now U.S. Pat. No. 4,424,334, all filed Dec. 28, 1981. The powdered particles formed according to this invention have also been found useful as flow control agents in powder coatings.

INDUSTRIAL APPLICABILITY

It should be apparent from the foregoing, that the particles of this invention find application in coatings as, for example, flow control agents.

The following examples are presented by way of description of the composition of the invention and set forth the best mode contemplated by the inventors but are not to be construed as limiting.

EXAMPLE 1

Capped poly(12-hydroxystearic acid)

12-hydroxystearic acid (2410.00 g) and xylene (500.00 g) were heated to obtain a solution. Tetraisopropyl titanate (1.50 g, Tyzor TPT, DuPont) was added to the solution and refluxed for 30 hours under a Dean-Stark water separator to collect 106.00 grams water. Fifty grams of stearic acid were added to the reaction mixture and refluxing was continued for ten hours until no more water was collected. Infrared spectrum of product showed complete disappearance of hydroxy absorption band. The molecular weight ($\overline{M}_w/\overline{M}_n$) of product was 4195/2110=1.99.

Macromonomer

One gram of Cordova accelerator AMC ™ -2 was added to the above solution and heated to 75° C. Glycidyl methacrylate (158.00 g) was added dropwise to the solution with continuous stirring. The reaction mixture was stirred at 75° C.–85° C. until almost complete disappearance of glycidyl group band. Solids content 71.8%.

Stabilizer Precursor and Stabilizer

The monomers (292.00 g macromonomer, 186.00 g methyl methacrylate and 22.00 g hydroxyethyl methacrylate) and 5.00 g AIBN in 70.00 g butyl acetate were combined and added dropwise to the refluxing butyl acetate (210.00 g) in four hours under nitrogen atmosphere. After the addition was complete, 1.00 g AIBN was added to the reaction mixture and it was refluxed for 2.5 additional hours. The solids content was 52.80% (precursor). Hydroquinone (0.66 g in 10.00 g butyl acetate) was added to the above solution. After raising the temperature of reaction mixture to 60° C., 0.25 g dibutyltin dilaurate and 6.50 g isocyanatoethyl methacrylate dissolved in aliphatic hydrocarbon (40.00 g, b.p. 127°–140° C.) were added dropwise. The mixture was stirred at 60° C. until the isocyanate group disappeared. Then it was diluted with aliphatic hydrocarbon (b.p. 127°–140° C.) to a solids content of 43.00%. (stabilizer) The molecular weight ($\overline{M}_w/\overline{M}_n$) of this product was 10120/4990=2.03.

Preparation of Non-Aqueous Dispersion

In a two-liter flask equipped with a condenser, gas inlet tube, thermometer, sample port and mechanical stirrer was charged 373.00 g heptane. As the temperature was raised to the boiling point of heptane, methyl methacrylate (13.00 g), stabilizer (3.20 g) and AIBN (1.00 g) were poured into the flask. After refluxing the reaction mixture for thirty minutes, the following mixture was added dropwise over a period of four hours under a nitrogen atmosphere: stabilizer (65.00 g), methyl methacrylate (360.00 g), hexamethoxy melamine (Cymel 301) (20.00 g), hydroxyethyl methacrylate (20.00 g), aliphatic hydrocarbon (135.00 g), 1-octanethiol (3.50 g), AIBN (1.40 g) phenyl acid phosphate (4.00 g), 40% solution in isopropanol). Upon completion of monomer addition, 0.40 g AIBN in 5.00 g butyl acetate were added. Refluxing was continued for 3.5 additional hours. Solids content was 46.20%, average particle size approximately 0.29 μm and viscosity at 25° C. was 9.5 sec. (Ford Cup #4).

A coating formulation was prepared by combining the following ingredients:

| 1. Tetrahydroxy oligomer (90% solids, $M_n$ = 800) | 60.00 g |
|---|---|
| 2. Cymel 325 (80% solids) | 21.00 g |
| 3. Dispersed particles (45.10% solids) | 11.00 g |
| 4. Phenyl acid phosphate (40% in isopropanol) | 1.70 g |
| 5. Methyl amyl ketone | 30.00 g |

This formulation exhibited good flow control after spraying and during curing at 130° C. for 20 minutes. The cured films had good physical properties.

EXAMPLE 2

Example 1 was repeated with the exception in the method of preparing capped poly(12-hydroxystearic acid). 12-hydroxystearic acid (2410.00 g), stearic acid (100.00 g) and xylene (500.00 g) were heated to obtain a solution. Tetraisopropyl titanate (1.50 g, Tyzor TPT) was added to the solution and the mixture was refluxed under a Dean-Stark water separator until no more water was released. Infrared spectrum of the product showed complete disappearance of the hydroxy absorption band. This capped acid was used as in Example 1 in preparing a non-aqueous dispersion which was combined with the following ingredients in preparing a coating formulation:

| 1. Hydroxy acrylic polymer (30% hydroxy monomer, $\overline{M}_n$ = 1850 and 80% solids) | 100.00 g |
|---|---|
| 2. Cymel 325 (80% solids) | 40.00 g |
| 3. Dispersed particles (45.10% solids) | 20.00 g |
| 4. Phenyl acid phosphate (40% in isopropanol) | 2.50 g |
| 5. Methyl amyl ketone | 40.00 g |

The coating composition exhibited excellent flow control during application and baking at 130° C. for 20 minutes. In the absence of dispersed particles, the flow control of this coating composition was poor.

EXAMPLE 3

The stabilizer of Example 1 was employed in preparing particles with lower crosslinking density. In a four-liter flask equipped with a condenser, gas inlet tube, thermometer, sample port and mechanical stirrer was charged 750.00 g heptane. As the temperature was raised to the boiling point of heptane, methyl methacrylate (27.00 g), stabilizer (6.50 g) and AIBN (2.00 g) were poured into the flask. After refluxing the reaction mixture for thirty minutes, the following mixture was added dropwise over a period of four hours under a nitrogen atmosphere: stabilizer (130.00 g), methyl methacrylate (720.00 g), hexamethoxy melamine (Cymel 301, 10.00 g), hydroxyethyl methacrylate (10.00 g), aliphatic hydrocarbon (270.00 g, b.p. 127°–140° C.), 1-octanethiol (7.00 g), AIBN (2.50 g) and phenyl acid phosphate (2.00 g, 40% solution in isopropanol). Refluxing was continued for two additional hours. Solids content was 45.70%, average particle size approximately 0.27 μm and viscosity at 25° C. was 9.6 sec. (Ford Cup #4).

Incorporation of this non-aqueous dispersion in high solids coatings controls the flow and the cured films have good properties.

EXAMPLE 4

Example 1 is repeated by using the same stabilizer but different amount of ingredients for preparing the dispersion. In a one-liter flask equipped with a condenser, gas inlet tube, thermometer, sample port and mechanical stirrer was charged 184.00 g heptane. To the boiling heptane was added a mixture of methyl methacrylate (7.00 g), stabilizer (1.60 g) and AIBN (0.50 g). After refluxing the reaction mixture for thirty minutes, the following mixture was added over a period of three hours under a nitrogen atmosphere: stabilizer (33.00 g), methyl methacrylate (120.00 g), styrene (60.00 g), hexamethoxy melamine (Cymel 301, 25.00 g), hydroxyethyl methacrylate (25.00 g), 60.00 g aliphatic hydrocarbon (b.p. 127°–140° C.), phenyl acid phosphate (3.00 g, 40% in isopropanol) and AIBN (0.70 g). After completion of monomer addition, 0.2 g AIBN in 5.00 g butyl acetate were added. Refluxing was continued for three additional hours. Solids content was 45.60%, average particle size 0.33 μm and viscosity at 25° C. was 9.8 sec. (Ford Cup #4). Paints containing these dispersed particles had good flow properties.

EXAMPLE 5

Example 1 was repeated with the exception that the amount of stabilizer was increased. To 373.00 g heptane was added a mixture of methyl methacrylate (13.00 g), stabilizer (3.20 g) and AIBN (1.00 g). After refluxing the reaction mixture for thirty minutes, the following mixture was added over a period of three hours under a nitrogen atmosphere: stabilizer (200.00 g), methyl methacrylate (360.00 g), hexamethoxy melamine (Cymel 301, 20.00 g) (23.00 g), hydroxyethyl methacrylate (20.00 g), aliphatic hydrocarbon (135.00 g), 1-octanethiol (3.50 g), AIBN (1.40 g) and phenyl acid phosphate (4.00 g, 40% in isopropanol). The mixture was refluxed for 4 hours. The dispersed particles were used in preparing coating compositions.

EXAMPLE 6

Example 3 was repeated with the exception that the macromonomer was prepared by the following procedure: capped poly(12-hydroxystearic acid) (500.00 g), isocyanatoethyl methacrylate (45.00 g), dibutylin dilaureate (0.23 g) and hydroquinone (1.50 g) were heated at 60° C. with stirring until all the isocyanate groups disappeared. This macromonomer was employed in preparing the stabilizer as in Example 3. Nonaqueous dispersions from this stabilizer were suitable for controlling the flow of paint compositions.

EXAMPLE 7

The procedures of Example 1 were repeated with the single exception that an equal amount of Cymel 303 was employed in preparing the dispersed particles. The resulting nonaqueous dispersions were stable and suitable for controlling the flow of coating compositions.

EXAMPLE 8

Example 3 was repeated with the exception in the preparation of dispersion. To 750.00 g of boiling heptane were added 6.5 g stabilizer, 27.00 g methyl methacrylate and 2.00 g AIBN. After refluxing the reaction mixture for 30 minutes, the following monomer mixture was added dropwise over a period of 4 hours under a nitrogen atmosphere: stabilizer (130.00 g), methyl methacrylate (720.00 g) Cymel 325 (10.00 g), hydroxyethyl methacrylate (10.00 g), aliphatic hydrocarbon (270.00 g), b.p. 127°–140° C.), and phenyl acid phosphate (1.00 g, 40% in isopropanol) and AIBN (3.00 g). Refluxing was continued for 3 hours. The dispersion was stable and was used in preparing coating compositions.

EXAMPLE 9

The preparation of nonaqueous dispersion in Example 1 is repeated with the exception that the stabilizer precursor is employed for stabilizing the particles. When these particles were added to coating compositions, they exhibit good flow control.

EXAMPLE 10

The procedure of Example 7 was repeated with the single exception that 40.00 g stabilizer were employed in preparing the nonaqueous dispersion. Solids content was 46.00%, average particle size 0.30 μm and viscosity at 25° C. was 9.8 sec. (Ford cup #4). The dispersion was stable and controlled the flow of high solids coatings.

EXAMPLE 11

Example 7 was repeated with the single exception that in the preparation of dispersion 5.00 g hydroxyethyl methacrylate was replaced with an equal amount of methacrylic acid. The nonaqueous dispersion was stable and controlled the flow of coating compositions.

EXAMPLE 12

Example 7 was repeated with the exception that in the preparation of dispersion 4.00 g hydroxyethyl methacrylate was replaced with an equal amount of glycidyl methacrylate. The resulting particles were stable and controlled the flow of paint compositions.

EXAMPLE 13

The procedure of preparing the stabilizer in Example 1 was repeated but the reactive monomers in preparing the crosslinked particles were changed. In a two-liter flask equipped with a condenser, gas inlet tube, thermometer, sample port and mechanical stirrer were charged 380.00 g heptane. As the temperature was raised to the boiling point of heptane, methyl methacrylate (14.00 g), stabilizer (4.20 g, Example 1) and AIBN (1.00 g) were poured into the flask. After refluxing the reaction mixture for thirty minutes, the following mixture was added dropwise over a period of three hours under a nitrogen atmosphere: stabilizer (Example 1, 70.00 g), butyl methacrylate (50.00 g), methyl methacrylate (223.00 g), styrene (100.00 g), glycidyl methacrylate (18.00 g), azelaic acid (13.00 g), 1-octanethiol (3.50 g), 130.00 g aliphatic hydrocarbon (b.p. 127°–140° C.), dimethyldodecyl amine (0.90 g) and AIBN (1.40 g). Upon completion of monomer addition, 0.5 g AIBN in 4.00 g butyl acetate were added. Refluxing was continued for 3 hours. Solids content was 45.90%, average particle size 0.31 μm and viscosity at 25° C. was 10 sec. (Ford cup #4). The crosslinked, dispersed particles were suitable for controlling the flow of coatings prepared by mixing the following ingredients:

| | |
|---|---|
| 1. Tetrahydroxy oligomer (90% solids, $\overline{M}_n$ = 800) | 145.00 g |
| 2. Cymel 325 (80% solids) | 46.00 g |
| 3. Dispersed particles (47.30% solids) | 27.00 g |
| 4. Phenyl acid phosphate (40% in isopropanol) | 4.00 g |

| -continued | |
|---|---|
| 5. Methyl amyl ketone | 72.00 g |

This formulation was applied on primed panels and exhibited no sagging during application and baking 130° C. for 20 minutes.

EXAMPLE 14

The procedure of Example 1 was repeated with the exception that different reactive monomers were employed in preparing the crosslinked particles. To boiling heptane (373.00 g) were added methyl methacrylate (13.00 g), stabilizer (3.20 g) and AIBN (1.00 g). After refluxing the reaction mixture for thirty minutes, the following mixture was added dropwise over a period of three hours under nitrogen atmosphere: stabilizer (65.00 g), methyl methacrylate (360.00 g), hydroxy ethyl methacrylate (20.00 g), isophorone diisocyanate (IPDI, 20.00 g), aliphatic hydrocarbon (135.00 g, b.p. 127°-140° C.), 1-octanethiol (3.50 g) and AIBN (1.50 g). At the completion of monomer addition, 0.20 g AIBN in 5.00 butyl acetate were added and dispersion was refluxed for 3 additional hours. The dispersed particles (average particle size 0.29 μm) controlled the flow of coating compositions.

EXAMPLE 15

Example 1 was repeated with the exception that other reactive monomers were employed in preparing the crosslinked particles. To boiling heptane (380.00 g) the following mixture of ingredients was added dropwise over a period of four hours under a nitrogen atmosphere: stabilizer (65.00 g), methyl methacrylate (36.00 g), methacrylic acid (15.00 g), 1,4-butane diol diglycidyl ether (18.00 g), 1-octanethiol (3.50 g), dimethyl dodecyl amine (0.95 g), aliphatic hydrocarbon (130.00 g, b.p. 127°-140° C.) and AIBN (1.50 g). 0.3 g AIBN in 4.00 g butyl acetate were added and the dispersion was refluxed for three additional hours. The particles were stable (average particle size 0.32 μm).

EXAMPLE 16

The procedure of Example 1 was repeated with the exception that the following amounts of ingredients were used for the preparation of dispersion: To 800.00 g boiling naphtha (b.p. 120°-140° C.) were added the following ingredients dropwise over a period of 4 hours under a nitrogen atmosphere: stabilizer (125.00 g), methyl methacrylate (35.00 g), Cymel 301 (10.00 g), hydroxyethyl methacrylate (10.00 g), naphtha (70.00 g), phenyl acid phosphate (0.10 g, 40% in isopropanol) and AIBN (1.00 in 5.00 g butyl acetate). Refluxing was continued for 3 hours and part of solvent was removed by distillation. The particles were stable (42.00% solids) and their average particle size was 0.2 μm.

In view of the disclosure, many modification of this invention will be apparent to those skilled in the art. It is intended that all such modifications which fall within the true scope of this invention be included within the terms of the appended claims.

We claim:

1. A stable dispersion containing crosslinked polymer particles formed by reactions comprising addition polymerization of:
    (a) between about 0.5 and about 20 weight percent each of first and second monomers, wherein said first monomer bears ethylenic unsaturation and functionality capable of crosslinking reaction with other functionality present on said second monomer, said second monomer bearing at least two functional groups of said other functionality and bearing no ethylenic unsaturation; and
    (b) between about 99 and about 60 weight percent of at least one other monoethylenically unsaturated monomer;

in the presence of (I) an organic liquid which is a solvent for the polymerizable monomers, but a non-solvent for the resultant polymer, and (II) polymeric dispersion stabilizer containing at least two segments with one segment being solvated by said organic liquid and the second segment being of different polarity than said first segment and relatively insoluble in said organic liquid, wherein the reaction is carried out at elevated temperatures such that the dispersion polymer first forms and then is crosslinked, wherein the precursor of said first segment of said stabilizer comprises a long chain hydrocarbon molecule having only one reactive group per said molecule.

2. A dispersion according to claim 1, wherein said polymeric dispersion stabilizer is a graft copolymer containing two polymeric segments with one segment being solvated by said dispersing liquid and the second segment being an anchor polymer of different polarity than said first segment and relatively non-solvatable by said dispersing liquid, and wherein said polymeric dispersion stabilizer contains pendant groups which have been addition copolymerized with the ethylenically unsaturated monomers in the copolymerization process.

3. A dispersion according to claim 2, wherein said polymeric dispersion stabilizer is formed by graft copolymerizing (i) the reaction product of said long chain hydrocarbon molecule having only one reactive group per molecule and an unsaturated monomer containing functionalitly capable of reacting with said one reactive group of said molecule with (ii) two ethylenically unsaturated monomers, each having functionality capable of reacting with the other, and at least one other monoethylenicallly unsaturated monomer.

4. A dispersion according to claim 3, wherein said stabilizer is formed by graft copolymerizing (i) the reaction product of said long chain hydrocarbon molecules having only one reactive group per molecule and an unsaturated monomer containing functionality reactive with said one reactive group on said molecule first with (ii) one of two ethylenically unsaturated monomers, each having functionality capable of reacting with the other, and at least one other monoethylenically unsaturated monomer to form a reaction product which is thereafter reacted with the other of said two ethylenically unsaturated monomers.

5. A dispersion according to claim 1, wherein said long chain hydrocarbon molecule having only one reactive group per molecule has a number average molecular weight ($M_n$) between about 350 and about 3300.

6. A dispersion according to claim 5, wherein said molecule is formed by reacting poly(12-hydroxystearic acid) with an alkyl monocarboxylic acid wherein the alkyl group comprises a $C_3$-$C_{17}$ alkyl group.

7. A dispersion according to claim 3, wherein said reactive group on said molecule is carboxyl and said unsaturated monomer containing functionality capable of reacting with said one reactive group of said molecule is selected from the group consisting of glycidyl methacrylate and isocyanatoethyl methacrylate.

8. A dispersion according to claim 3, wherein the pairs of reactive functionalities present on said two ethylenically unsaturated monomers reacted to form the polymeric dispersion stabilizer are selected from the group consisting of (a) isocyanate and hydroxyl; (b) acid and epoxide; (c) epoxide and amine; (d) acid anhydride and hydroxyl; (e) acid anhydride and amine; (f) acid anhydride and mercaptan; (g) hemiformal and amide; (h) carbonate and amine; (i) cycloimide and amine; (j) cycloimide and hydroxyl; and (k) imine and alkoxysilane.

9. A dispersion according to claim 3, wherein said two ethylenically unsaturated monomers, each having functionality capable of reacting with the other, are each employed in an amount of between about 0.5 and 10 weight percent and said other monoethylenically unsaturated monomer is employed in an amount of between about 99.0 and about 80 weight percent in forming said dispersion stabilizer.

10. A dispersion according to claim 1, wherein the pairs of crosslinking functionalities of said first and second monomers used to form the dispersed polymer particles are selected from the group consisting of (a) hydroxyl and isocyanate; (b) acid and epoxide; (c) epoxide and amine; (d) amine and hydroxyl; (e) acid anhydride and amine; (f) acid anhydride and mercaptan; (g) hemiformal and amide; (h) carbonate and amine; (i) cycloimide and amine; (j) cycloimide and hydroxyl; (k) imine and alkoxysilane; and (l) hydroxyl and acid anhydride.

11. A dispersion according to claim 9, wherein said dispersing liquid is an aliphatic hydrocarbon solvent and said first ethylenically unsaturated monomer (a) and said at least one other ethylenically unsaturated monomer (b) used in the preparation of said dispersion particle are acrylic monomers.

12. A dispersion according to claim 9, wherein said particles are formed by free radical addition copolymerization in the presence of hydrocarbon dispersing liquid of from about 0.5 to about 20 weight percent of ethylenically unsaturated hydroxy monomer, from about 0.5 to about 20 weight percent of crosslinking monomer selected from the group consisting of amine-aldehyde resins, and from about 99 to about 60 weight percent of at least one other copolymerizable monoethylenically unsaturated monomer.

13. A dispersion according to claim 12, wherein said monomers used in the addition copolymerization to form the dispersed polymer particles wherein said ethylenically unsaturated hydroxy monomer is hydroxyethyl methacrylate.

14. Crosslinked polymer particles obtained by the removal of said solvent from said dispersion formed in claim 1.

* * * * *